United States Patent
Guo et al.

(10) Patent No.: US 12,039,788 B2
(45) Date of Patent: Jul. 16, 2024

(54) PATH PLANNING METHOD AND SYSTEM USING THE SAME

(71) Applicant: NATIONAL YANG MING CHIAO TUNG UNIVERSITY, Hsinchu (TW)

(72) Inventors: Jiun-In Guo, Hsinchu (TW); Jen-Shuo Chang, Taichung (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 397 days.

(21) Appl. No.: 17/584,879

(22) Filed: Jan. 26, 2022

(65) Prior Publication Data

US 2023/0154203 A1    May 18, 2023

(30) Foreign Application Priority Data

Nov. 16, 2021    (TW) .................................. 110142540

(51) Int. Cl.
| | |
|---|---|
| *G01S 17/89* | (2020.01) |
| *G06T 7/143* | (2017.01) |
| *G06V 10/762* | (2022.01) |
| *G06V 20/56* | (2022.01) |

(52) U.S. Cl.
CPC ............ *G06V 20/588* (2022.01); *G01S 17/89* (2013.01); *G06T 7/143* (2017.01); *G06V 10/763* (2022.01); *G06T 2207/20221* (2013.01)

(58) Field of Classification Search
CPC ...... G06V 20/56; G06V 20/58; G06V 20/588; G06T 2207/20221; G01S 17/89
USPC .......................... 382/173, 224, 206, 190, 181
See application file for complete search history.

(56) References Cited

U.S. PATENT DOCUMENTS

2018/0188059 A1* 7/2018 Wheeler ............ G01C 21/3638

FOREIGN PATENT DOCUMENTS

| TW | I494234 B | 8/2015 |
|---|---|---|
| TW | 202000516 A | 1/2020 |

OTHER PUBLICATIONS

Kato, et al. "Autoware on Board: Enabling Autonomous Vehicles with Embedded Systems." 9th ACM/IEEE International Conference on Cyber-Physical Systems (Apr. 2018), pp. 288-296. doi: 10.1109/ICCPS.2018.00035.
GITHUB—"Apollo Auto / apollo: an Open Autonomous Driving Platform." https://github.com/ApolloAuto/apollo (retrieved Jan. 13, 2022).

* cited by examiner

*Primary Examiner* — Jamares Q Washington
(74) *Attorney, Agent, or Firm* — Rosenberg, Klein & Lee (57) ABSTRACT

A path planning system includes an image-capturing device, a point-cloud map-retrieving device, and a processing device. The image-capturing device captures a first and a second camera road image. The point-cloud map-retrieving device retrieves distance data points to create a road distance point-cloud map. The processing device receives the road distance point-cloud map and the first and second camera road images, calibrates and fuses those to generate a road camera point-cloud fusion map, and then determines the road-line information of the second camera road image to generate a road-segmented map. The road-segmented map and the road camera point-cloud fusion map are fused. The distance data of the road-segmented map are obtained according to distance data points. A front driving path for the target road is planned according to the distance data.

16 Claims, 7 Drawing Sheets

PATH PLANNING METHOD AND SYSTEM USING THE SAME

This application claims priority of Application No. 110142540 filed in Taiwan on 16 Nov. 2021 under 35 U.S.C. § 119; the entire contents of all of which are hereby incorporated by reference.

BACKGROUND OF THE INVENTION

Field of the Invention

The present invention relates to a technology for planning a driving path, particularly to a path planning method and a system using the same.

Description of the Related Art

In recent years, as the development of self-driving technology has become more and more mature, relevant open-source self-driving software has been put into the market. In the past, the detection of the front path was mostly performed by image processing. Thus, a distance between the vehicle and the front intersection is detected based on the front image. However, when the distance parameter converted from the front image does not match the actual distance, the distance between the vehicle and the front intersection may not be accurately detected, which may cause danger when passing the intersection.

Therefore, in order to solve the foregoing problem that the distance is difficultly estimated, a high-precision vector map is developed. High-precision refers to high-precision positioning. Therefore, the high-precision vector map refers to a map that contains rich geographic information and has high-precision coordinates. The high-precision vector map can be used to obtain accurate path points, which reduces the difficulty of path planning.

Autoware is a self-driving open source architecture proposed by the Shinpei Kato team of Nagoya University in Japan. Autoware uses a high-precision vector map, which contains traffic information such as road lines, traffic lights, and intersections, and obtains the driving paths of roads in the intersection area from the vector information.

Internet companies in China have also proposed self-driving software (e.g., Apollo), which is similar to Autoware. Apollo also uses a high-precision vector map.

However, a lot of manpower as well as the construction of complex vector marking software and the cooperation of government departments are needed in order to effectively obtain the marking of high-precision vector maps. In addition, the formats of high-precision vector maps in various regions are not yet completely unified, which increases the difficulty of marking.

To overcome the abovementioned problems, the present invention provides a path planning method and a system using the same, so as to solve the afore-mentioned problems of the prior art.

SUMMARY OF THE INVENTION

The primary objective of the present invention is to provide a path planning method and a system using the same, which merely require a road image and a distance sensor to cooperate with a special algorithm, thereby precisely detecting a front path, planning a driving path, and greatly reducing a hardware cost.

Another objective of the present invention is to provide a path planning method and a system using the same, which segment and detect road lines and integrate with a road distance point-cloud map in order to greatly improve the precision of path detection and greatly save an operation amount.

In order to achieve the foregoing objectives, the present invention provides a path planning method, which includes: inputting a road distance point-cloud map, a first camera road image, and a second camera road image of a target road, wherein the road distance point-cloud map is created according to actual coordinates of a plurality of distance data points of the target road; calibrating and fusing the road distance point-cloud map and the first camera road image to generate a road camera point-cloud fusion map and determining road-line information of the second camera road image to generate a road-segmented map of the target road; and fusing the road-segmented map and the road camera point-cloud fusion map according to their feature points, thereby obtaining a plurality of distance data of the road-segmented map according to the plurality of distance data points, and planning a front driving path for the target road according to the plurality of distance data. In an embodiment of the present invention, the path planning method further includes performing a path operation on the target road to plan the driving path when the number of the plurality of distance data points is larger than a threshold and a distance between each of the plurality of distance data points and the target road is less than a radius range.

In an embodiment of the present invention, the step of planning the driving path includes: computing the plurality of distance data points based on a vector quantization algorithm to determine initial road data of the target road; clustering the initial road data based on a clustering algorithm; and using circle equations and polynomials to fit a path of the target road, thereby planning the driving path.

In an embodiment of the present invention, the road distance point-cloud map is a road lidar point-cloud map.

In an embodiment of the present invention, the step of calibrating and fusing the road distance point-cloud map and the first camera road image includes: obtaining the internal parameters of a camera for capturing the first camera road image and the external parameters of the actual coordinates of the road distance point-cloud map and superposing the road distance point-cloud map and the first camera road image according to relationships between the internal parameters and the external parameters.

In an embodiment of the present invention, the step of determining the road-line information of the second camera road image to generate the road-segmented map includes: performing model initialization on the second camera road image to generate a model-initializing image; segmenting the model-initializing image to generate a road-predicting map; and computing the road-predicting map based on a probabilistic graphical model to generate a lane-segmented map and a road line-segmented map and fusing the lane-segmented map and the road line-segmented map to generate the road-segmented map.

The present invention also provides a path planning system, which includes an image-capturing device, a point-cloud map-retrieving device, and a processing device. The image-capturing device is configured to capture a first camera road image and a second camera road image of a target road. The point-cloud map-retrieving device is configured to retrieve a plurality of distance data points of the target road and create a road distance point-cloud map according to the actual coordinates of the plurality of distance data points. The processing device, connected to the image-capturing device and the point-cloud map-retrieving device, includes a point-cloud image-fusing module, a road area-recognizing module, and a path-planning module. The point-cloud image-fusing module is configured to receive, calibrate, and fuse the road distance point-cloud map and the first camera road image to generate a road camera point-cloud fusion map. The road area-recognizing module is configured to receive the second camera road image and determine the road-line information of the second camera road image to generate a road-segmented map of the target road. The path-planning module is connected to the point-cloud image-fusing module and the road area-recognizing module and configured to receive the road-segmented map and fuse the road-segmented map and the road camera point-cloud fusion map according to their feature points, thereby obtaining a plurality of distance data of the road-segmented map according to the plurality of distance data points. The path-planning module is configured to plan a front driving path for the target road according to the plurality of distance data.

In an embodiment of the present invention, the path-planning module performs a path operation on the target road to plan the driving path when the number of the plurality of distance data points is larger than a threshold and a distance between each of the plurality of distance data points and the target road is less than a radius range.

In an embodiment of the present invention, the path-planning module is configured to: compute the plurality of distance data points based on a vector quantization algorithm to determine initial road data of the target road; cluster the initial road data based on a clustering algorithm; and use circle equations and polynomials to fit a path of the target road, thereby planning the driving path.

In an embodiment of the present invention, the point-cloud image-fusing module is configured to obtain internal parameters of a camera for capturing the first camera road image and external parameters of the actual coordinates of the road distance point-cloud map and superpose the road distance point-cloud map and the first camera road image according to relationships between the internal parameters and the external parameters.

In an embodiment of the present invention, the road area-recognizing module is configured to: perform model initialization on the second camera road image to generate a model-initializing image; segment the model-initializing image to generate a road-predicting map; and compute the road-predicting map based on a probabilistic graphical model to generate a lane-segmented map and a road line-segmented map and fusing the lane-segmented map and the road line-segmented map to generate the road-segmented map.

In an embodiment of the present invention, the image-capturing device is a camera.

In an embodiment of the present invention, the point-cloud map-retrieving device is an optical lidar.

Below, the embodiments are described in detail in cooperation with the drawings to make easily understood the technical contents, characteristics and accomplishments of the present invention.

DETAILED DESCRIPTION OF THE INVENTION

Figure 1:
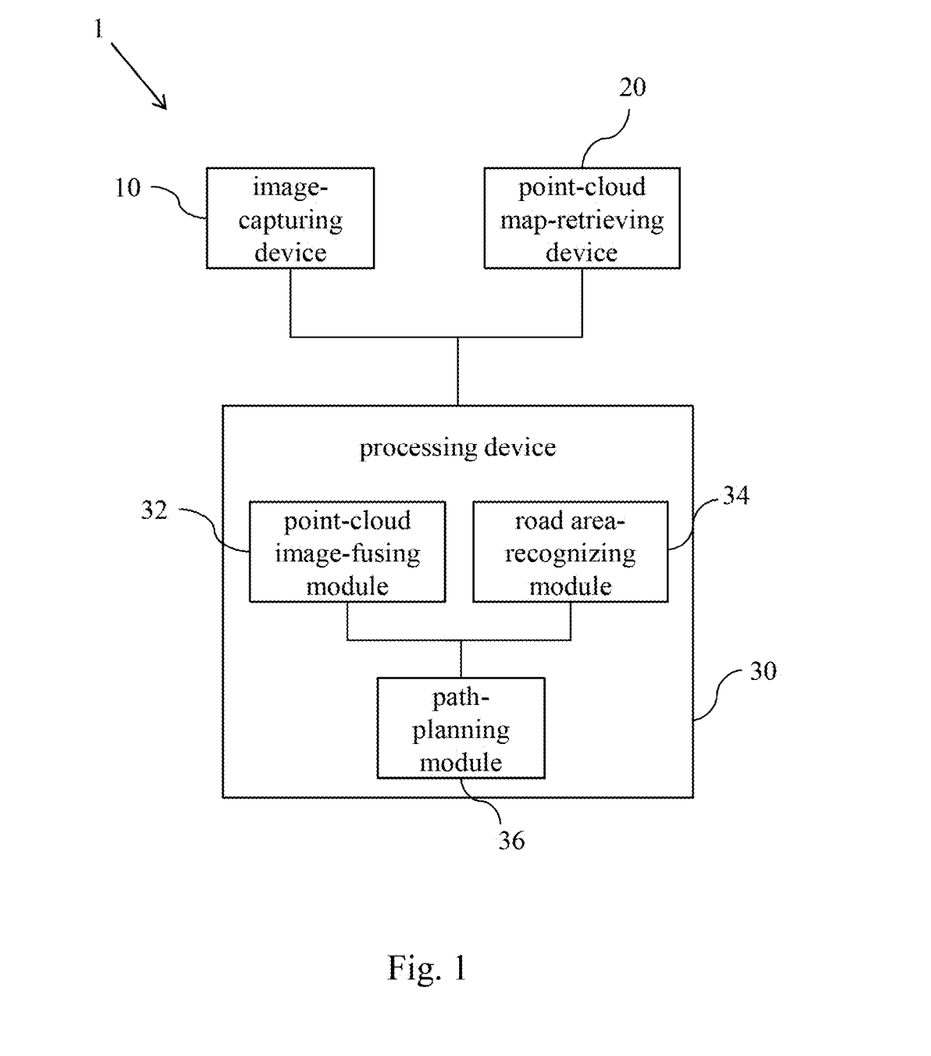
FIG. 1 is a schematic diagram illustrating a path planning system of the present invention.

The present invention provides a low-cost device, which uses a path planning technology with high precision. Referring to FIG. 1, the system architecture of the present invention is described as follows. A path planning system 1 may be installed on a driving vehicle and connected to an automatic driving system (not illustrated). The path planning system 1 detects a driving path that can drive straight, turn left or turn right at an intersection in front of a vehicle, and provides the driving path for the automatic driving system.

Referring to FIG. 1, the path planning system 1 includes an image-capturing device 10, a point-cloud map-retrieving device 20, and a processing device 30. The image-capturing device 10 and the point-cloud map-retrieving device 20 are connected to the processing device 30. The image-capturing device 10 and the point-cloud map-retrieving device 20 may transmit the retrieved data to the processing device 30 for the planning the driving path of a vehicle. In the embodiment, the image-capturing device 10 may be a camera arranged on the nose of the vehicle. The image-capturing device 10 captures a target road in front of the vehicle, namely a first camera road image and a second camera road image of the target road. The point-cloud map-retrieving device 20 may be a lidar arranged on the top of the vehicle and aimed at the front of the vehicle. The point-cloud map-retrieving device 20 detects the distance of an object on the front target road to generate a plurality of distance data points of the target road. The point-cloud map-retrieving device 20 creates a road distance point-cloud map according to the actual coordinates of the plurality of distance data points. In the embodiment, the road distance point-cloud map is a road lidar point-cloud map.

The processing device 30 may be a calculator with an operation function. In the embodiment, the processing device 30 includes a point-cloud image-fusing module 32, a road area-recognizing module 34, and a path-planning module 36. The point-cloud image-fusing module 32 is configured to receive, calibrate, and fuse the road distance point-cloud map and the first camera road image to generate a road camera point-cloud fusion map. The road area-recognizing module 34 is configured to receive the second camera road image and determine the road-line information of the second camera road image to generate a road-segmented map of the target road.

The path-planning module 36 is connected to the point-cloud image-fusing module 32 and the road area-recognizing module 34. The path-planning module 36 receives the road-segmented map and fuses the road-segmented map and the road camera point-cloud fusion map according to their feature points, thereby obtaining a plurality of distance data of the road-segmented map according to the plurality of distance data points. The path-planning module 36 plans a front driving path for the target road according to the plurality of distance data.

Figure 2:
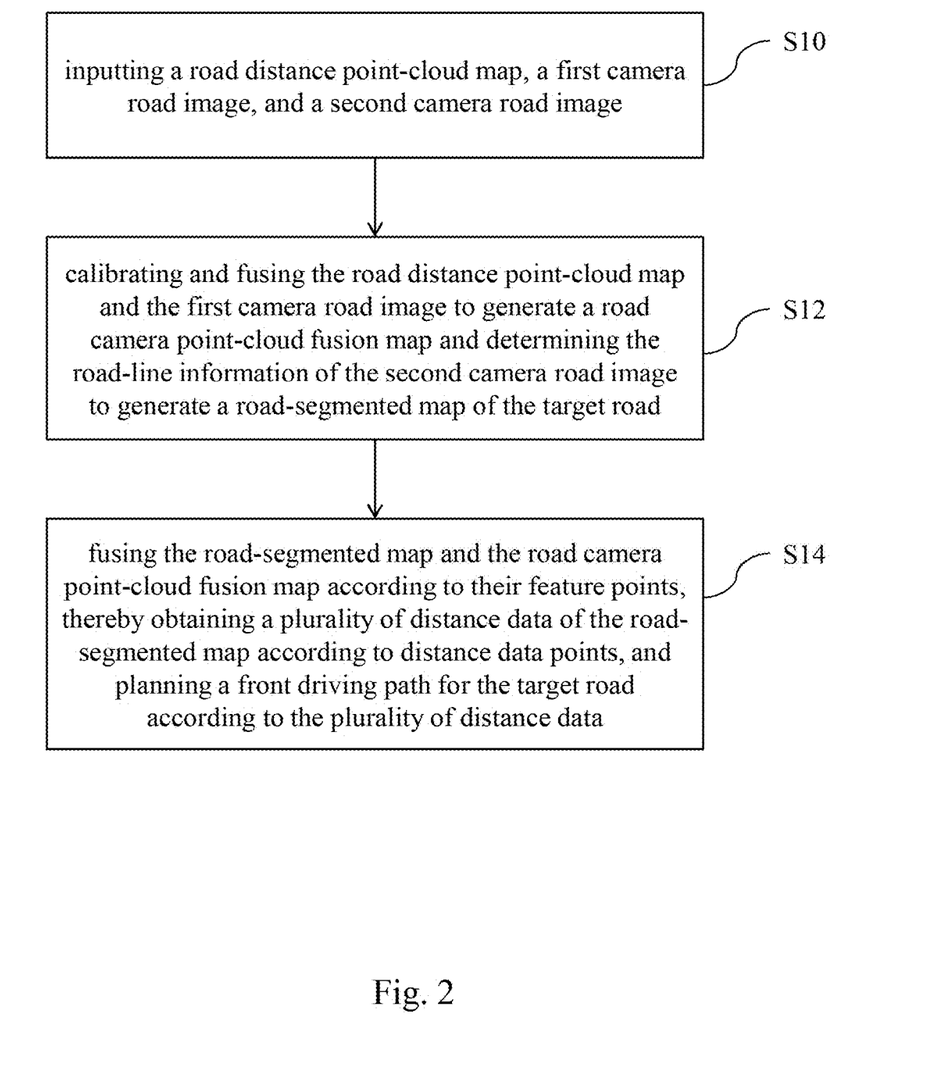
FIG. 2 is a flowchart of a path planning method of the present invention.

After describing the architecture of the path planning system 1, the flowchart that the path planning system 1 plans the driving path is detailed as follows. Referring to FIG. 1 and FIG. 2, the method of the present invention is described. In Step S10, the image-capturing device 10 captures the front road image to generate the first camera road image and the second camera road image. Simultaneously, the point-cloud map-retrieving device 20 emits a lidar signal to retrieve a plurality of distance data points of a front object. The point-cloud map-retrieving device 20 creates a road distance point-cloud map according to the actual coordinates of the plurality of distance data points, and then inputs the road distance point-cloud map, the first camera road image and the second camera road image to the processing device 30.

In Step S12, the point-cloud image-fusing module 32 of the processing device 30 calibrates and fuses the road distance point-cloud map and the first camera road image to generate a road camera point-cloud fusion map. The road area-recognizing module 34 determines the road-line information of the second camera road image to generate a road-segmented map of the target road.

Figure 3:
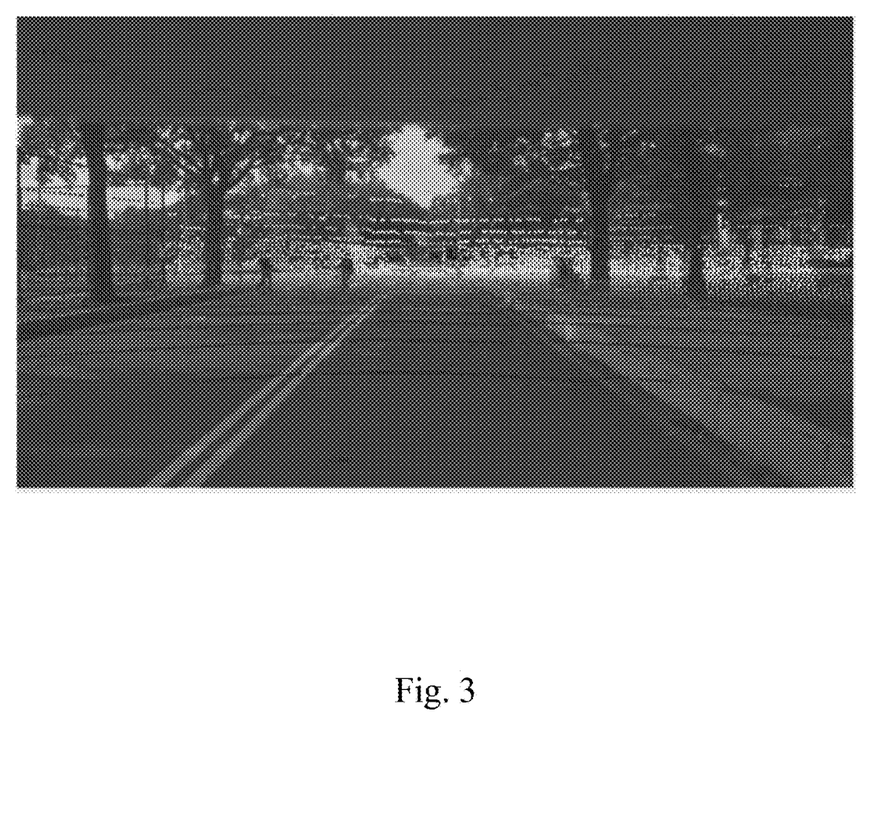
FIG. 3 is a schematic diagram illustrating a road camera point-cloud map of the present invention.

The step of calibrating and fusing the road distance point-cloud map and the first camera road image is detailed as follows. The point-cloud image-fusing module 32 obtains the internal parameters of a camera for capturing the first camera road image and the external parameters of the actual coordinates of the road distance point-cloud map and superposes the road distance point-cloud map and the first camera road image according to relationships between the internal parameters and the external parameters to generate the road camera point-cloud fusion map. As illustrated in FIG. 3, the road camera point-cloud fusion map shows the road distance point-cloud map in the corresponding position of the first camera road image.

Figure 4:
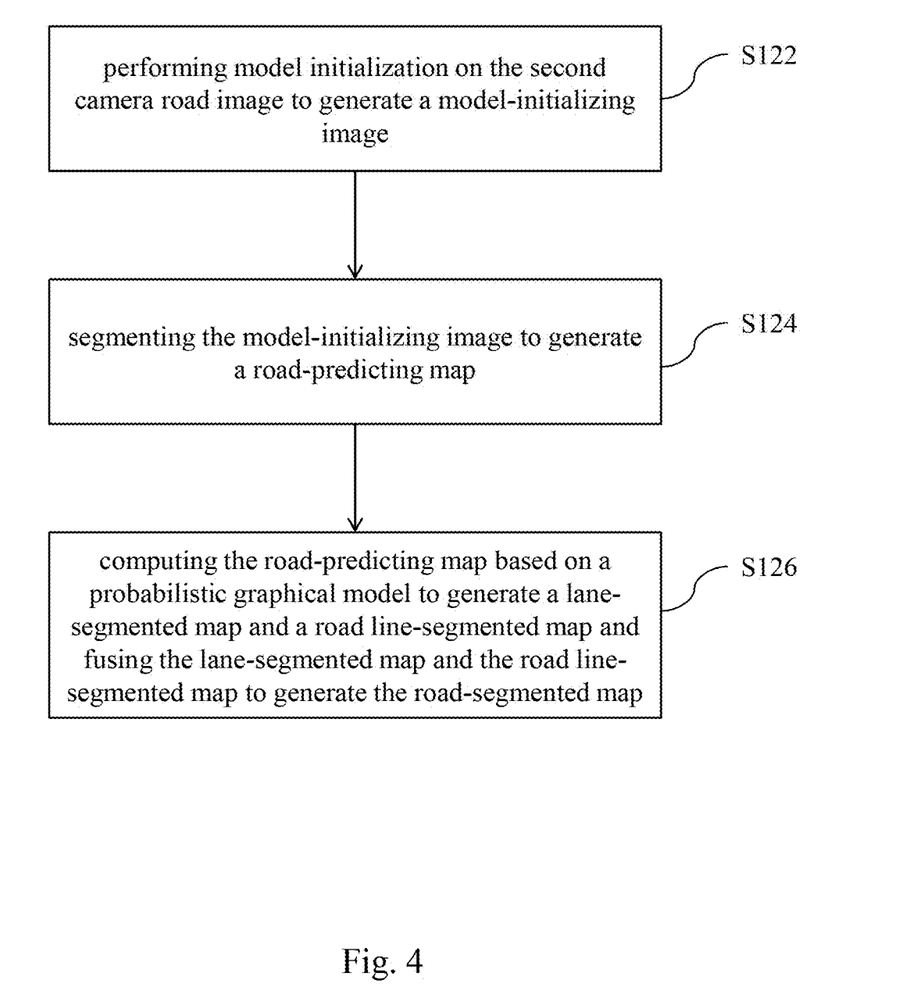
FIG. 4 is a flowchart of generating a road-segmented map of the present invention.
Figure 5:
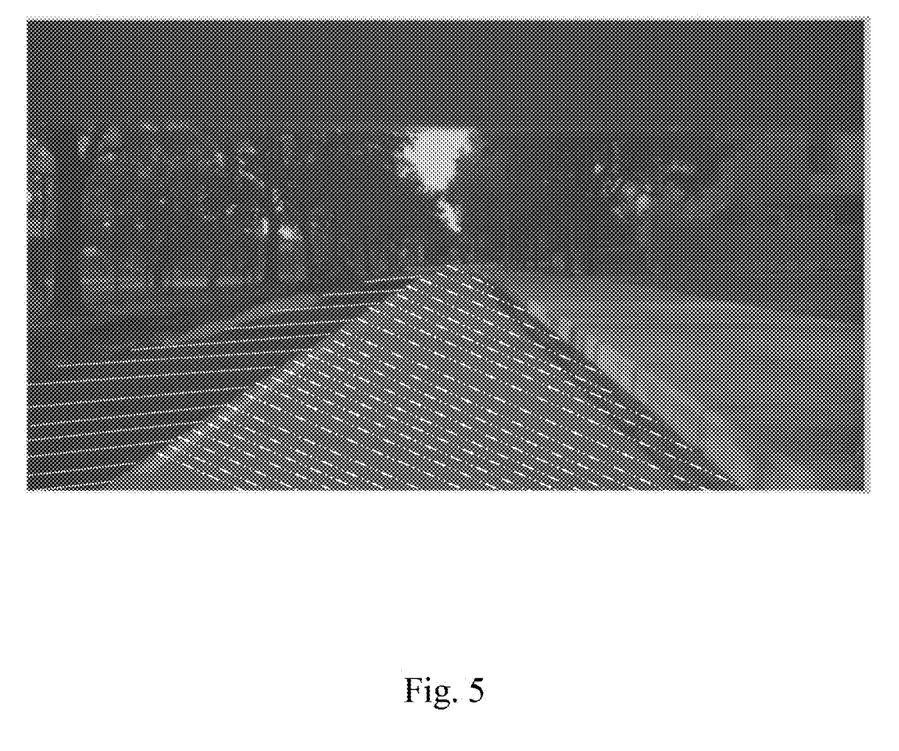
FIG. 5 is a schematic diagram illustrating a road-segmented map of the present invention.

Referring to FIG. 4 and FIG. 5, how the road area-recognizing module 34 determines the road-line information of the second camera road image to generate a road-segmented map of the target road is detailed as follows. Referring to FIG. 4, model initialization is performed on the second camera road image to generate a model-initializing image in Step S122. In Step S124, the model-initializing image is segmented to generate a road-predicting map. In Step S126, the road-predicting map is computed based on a probabilistic graphical model to generate a lane-segmented map and a road line-segmented map, and the lane-segmented map and the road line-segmented map are fused to generate the road-segmented map. As illustrated in FIG. 5, the road-segmented map marks road regions where the vehicle drives.

After generating the road camera point-cloud fusion map and the road-segmented map, the procedure proceeds to Step S14. In Step S14, the road camera point-cloud fusion map and the road-segmented map are transmitted to the path-planning module 36. The path-planning module 36 fuses the road-segmented map and the road camera point-cloud fusion map according to their feature points, thereby obtaining a plurality of distance data of the road-segmented map according to a plurality of distance data points. Before planning the driving path, the path-planning module 36 determines whether the number of the distance data points is larger than a threshold. If the number of the distance data points is larger than a threshold and a distance between each of the distance data points and the target road is less than a radius range, the path-planning module 36 notifies the automatic driving system of messages to stop driving the vehicle and performs a path operation on the target road to plan the driving path. For example, the threshold is 80 and a distance between each of the distance data points and the front intersection is less than the radius range of 1.2 meters.

Figure 6:
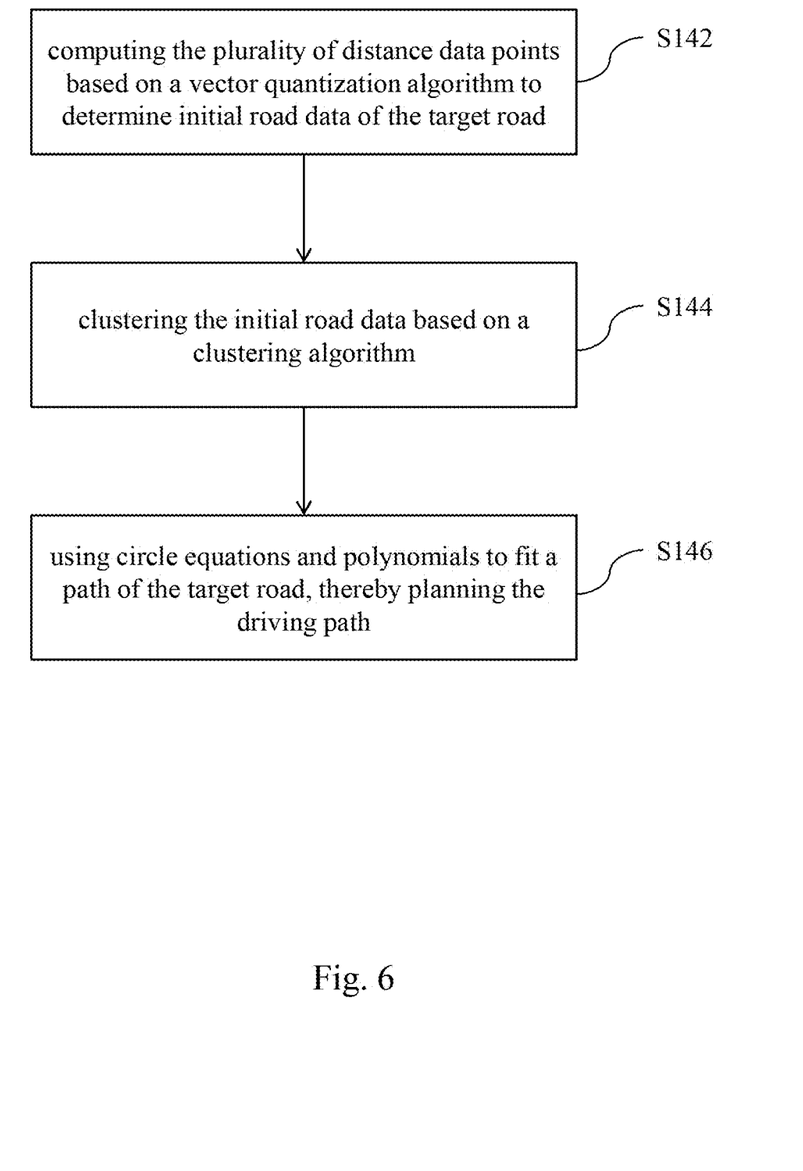
FIG. 6 is a flowchart of planning a driving path of the present invention.

Referring to FIG. 6, how the path-planning module 36 plans the driving path is detailed as follows. In Step S142, the path-planning module 36 computes the plurality of distance data points based on a vector quantization algorithm to determine the initial road data of the target road. In the embodiment, the vector quantization algorithm is a k-means algorithm.

In Step S144, the path-planning module 36 clusters the initial road data based on a clustering algorithm, wherein the clustering algorithm is density-based spatial clustering of applications with noise (DBSCAN).

Figure 7:
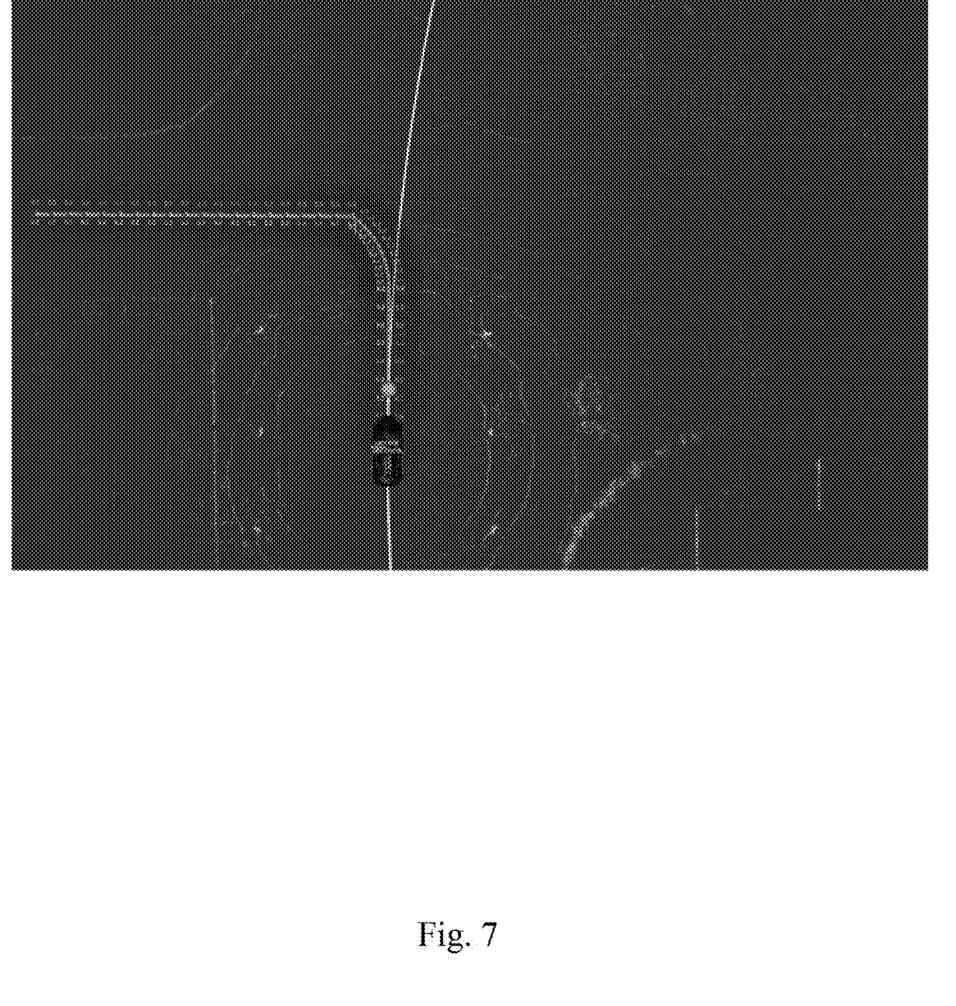
FIG. 7 is a schematic diagram illustrating a driving path of the present invention.

In Step S146, the path-planning module 36 uses circle equations and polynomials to fit the path of the target road, thereby planning the driving path. The embodiment exemplifies the front intersection. As a result, a straight driving path, a left-turn driving path, or a right-turn driving path is provided to the automatic driving system using the foregoing method. Then, the automatic driving system can select the required path to travel according to the driving destination. As illustrated in FIG. 7, FIG. 7 is a schematic diagram illustrating a left-turn driving path selected by the automatic driving system.

In conclusion, the present invention merely requires a road image and a distance sensor to cooperate with a special algorithm, thereby precisely detecting a front path, planning a driving path, and greatly reducing a hardware cost. The present invention segments and detects the road lines of a front image and integrates with the road distance point-cloud map in order to greatly improve the precision of path detection and greatly save an operation amount.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A path planning method comprising:
   inputting a road distance point-cloud map, a first camera road image, and a second camera road image of a target road, wherein the road distance point-cloud map is created according to actual coordinates of a plurality of distance data points of the target road;
   calibrating and fusing the road distance point-cloud map and the first camera road image to generate a road camera point-cloud fusion map and determining road-line information of the second camera road image to generate a road-segmented map of the target road;
   fusing the road-segmented map and the road camera point-cloud fusion map according to their feature points, thereby obtaining a plurality of distance data of the road-segmented map according to the plurality of distance data points, and planning a front driving path for the target road according to the plurality of distance data; and,
   performing a path operation on the target road to plan the driving path when the number of the plurality of distance data points is larger than a threshold and a distance between each of the plurality of distance data points and the target road is less than a radius range.

2. The path planning method according to claim 1, wherein the step of planning the driving path comprises:

computing the plurality of distance data points based on a vector quantization algorithm to determine initial road data of the target road;

clustering the initial road data based on a clustering algorithm; and using circle equations and polynomials to fit a path of the target road, thereby planning the driving path.

3. The path planning method according to claim 2, wherein the vector quantization algorithm is a k-means algorithm.

4. The path planning method according to claim 2, wherein the clustering algorithm is density-based spatial clustering of applications with noise (DBSCAN).

5. The path planning method according to claim 1, wherein the road distance point-cloud map is a road lidar point-cloud map.

6. The path planning method according to claim 5, wherein the step of calibrating and fusing the road distance point-cloud map and the first camera road image comprises:

obtaining internal parameters of a camera for capturing the first camera road image and external parameters of the actual coordinates of the road distance point-cloud map and superposing the road distance point-cloud map and the first camera road image according to relationships between the internal parameters and the external parameters.

7. The path planning method according to claim 1, wherein the step of determining the road-line information of the second camera road image to generate the road-segmented map comprises:

performing model initialization on the second camera road image to generate a model-initializing image;

segmenting the model-initializing image to generate a road-predicting map; and computing the road-predicting map based on a probabilistic graphical model to generate a lane-segmented map and a road line-segmented map and fusing the lane-segmented map and the road line-segmented map to generate the road-segmented map.

8. A path planning system comprising:

an image-capturing device configured to capture a first camera road image and a second camera road image of a target road;

a point-cloud map-retrieving device configured to retrieve a plurality of distance data points of the target road and create a road distance point-cloud map according to actual coordinates of the plurality of distance data points; and a processing device, connected to the image-capturing device and the point-cloud map-retrieving device, comprising:

a point-cloud image-fusing module configured to receive, calibrate, and fuse the road distance point-cloud map and the first camera road image to generate a road camera point-cloud fusion map;

a road area-recognizing module configured to receive the second camera road image and determine road-line information of the second camera road image to generate a road-segmented map of the target road; and a path-planning module connected to the point-cloud image-fusing module and the road area-recognizing module and configured to receive the road-segmented map and fuse the road-segmented map and the road camera point-cloud fusion map according to their feature points, thereby obtaining a plurality of distance data of the road-segmented map according to the plurality of distance data points, and the path-planning module is configured to plan a front driving path for the target road according to the plurality of distance data, wherein the path-planning module performs a path operation on the target road to plan the driving path when the number of the plurality of distance data points is larger than a threshold and a distance between each of the plurality of distance data points and the target road is less than a radius range.

9. The path planning system according to claim 8, wherein the path-planning module is configured to:

compute the plurality of distance data points based on a vector quantization algorithm to determine initial road data of the target road;

cluster the initial road data based on a clustering algorithm; and use circle equations and polynomials to fit a path of the target road, thereby planning the driving path.

10. The path planning system according to claim 9, wherein the vector quantization algorithm is a k-means algorithm.

11. The path planning system according to claim 9, wherein the clustering algorithm is density-based spatial clustering of applications with noise (DBSCAN).

12. The path planning system according to claim 8, wherein the road distance point-cloud map is a road lidar point-cloud map.

13. The path planning system according to claim 8, wherein the point-cloud image-fusing module is configured to obtain internal parameters of a camera for capturing the first camera road image and external parameters of the actual coordinates of the road distance point-cloud map and superpose the road distance point-cloud map and the first camera road image according to relationships between the internal parameters and the external parameters.

14. The path planning system according to claim 8, wherein the road area-recognizing module is configured to:

perform model initialization on the second camera road image to generate a model-initializing image;

segment the model-initializing image to generate a road-predicting map; and compute the road-predicting map based on a probabilistic graphical model to generate a lane-segmented map and a road line-segmented map and fusing the lane-segmented map and the road line-segmented map to generate the road-segmented map.

15. The path planning system according to claim 8, wherein the image-capturing device is a camera.

16. The path planning system according to claim 8, wherein the point-cloud map-retrieving device is an optical lidar.

* * * * *